United States Patent
Thomas et al.

(10) Patent No.: US 10,577,873 B2
(45) Date of Patent: Mar. 3, 2020

(54) SHAPE MEMORY ALLOY ROPE SOCKET FOR A DOWNHOLE TOOL

(71) Applicant: Halliburton Energy Services, Inc., Houston, TX (US)

(72) Inventors: Sean Gregory Thomas, Frisco, TX (US); Dominick Joseph Bellotte, Flower Mound, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 146 days.

(21) Appl. No.: 15/543,398

(22) PCT Filed: Feb. 13, 2015

(86) PCT No.: PCT/US2015/015838
§ 371 (c)(1),
(2) Date: Jul. 13, 2017

(87) PCT Pub. No.: WO2016/130147
PCT Pub. Date: Aug. 18, 2016

(65) Prior Publication Data
US 2018/0010400 A1     Jan. 11, 2018

(51) Int. Cl.
*E21B 17/02* (2006.01)
*F16G 11/02* (2006.01)

(52) U.S. Cl.
CPC ......... *E21B 17/023* (2013.01); *F16G 11/02* (2013.01); *F16G 11/025* (2013.01)

(58) Field of Classification Search
CPC .................................................. E21B 17/023
See application file for complete search history.

(56) References Cited

U.S. PATENT DOCUMENTS

| 4,773,680 | A | | 9/1988 | Krumme | |
|---|---|---|---|---|---|
| 5,478,970 | A | * | 12/1995 | Lawler | E21B 17/023 174/74 R |
| 6,269,883 | B1 | * | 8/2001 | Gissler | E21B 17/023 166/241.5 |
| 6,273,189 | B1 | * | 8/2001 | Gissler | E21B 4/04 166/241.1 |
| 6,835,083 | B1 | | 12/2004 | Alacqua et al. | |

(Continued)

FOREIGN PATENT DOCUMENTS

| KR | 10-2012-0129523 | 11/2012 |
|---|---|---|
| WO | 1993008492 | 4/1993 |

OTHER PUBLICATIONS

International Search Report and Written Opinion for PCT Patent Application No. PCT/US2014/015838, dated Oct. 29, 2015; 15 pages.

*Primary Examiner* — Kipp C Wallace
(74) *Attorney, Agent, or Firm* — Baker Botts L.L.P.

(57) ABSTRACT

In accordance with some embodiments of the present disclosure, a shape memory alloy rope socket for a downhole tool is disclosed. The rope socket includes a coupler formed of a shape memory alloy. The rope socket further includes a housing surrounding the coupler. The housing including a pathway and a connector for attaching a downhole tool is attached. The rope socket further includes a line passing through the pathway and the coupler such that the coupler is in contact with the line along a length of the coupler when the coupler is in a reduced diameter state.

17 Claims, 4 Drawing Sheets

(56) References Cited

U.S. PATENT DOCUMENTS

| | | | |
|---|---|---|---|
| 8,876,694 B2 | 11/2014 | Honaryar et al. | |
| 2008/0181555 A1* | 7/2008 | Head | E21B 17/023 |
| | | | 385/13 |
| 2009/0009026 A1 | 1/2009 | Biasiotto et al. | |
| 2012/0010697 A1 | 1/2012 | Shin et al. | |
| 2014/0138969 A1* | 5/2014 | Guidry | E21B 31/14 |
| | | | 294/86.13 |
| 2014/0209296 A1* | 7/2014 | Rahn | E21B 17/023 |
| | | | 166/242.6 |

* cited by examiner

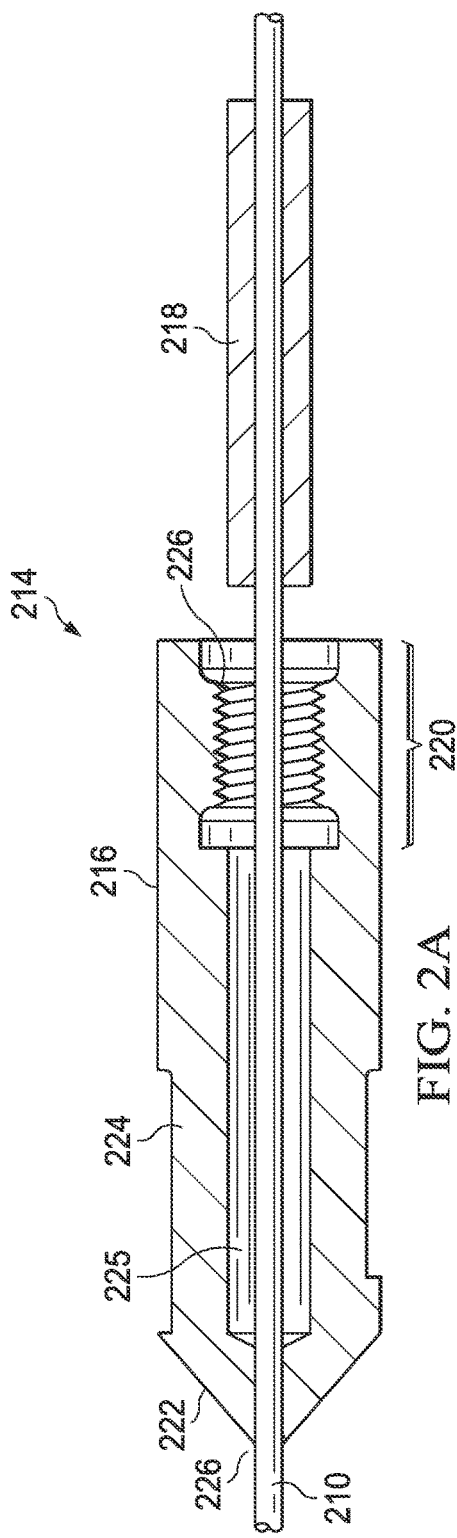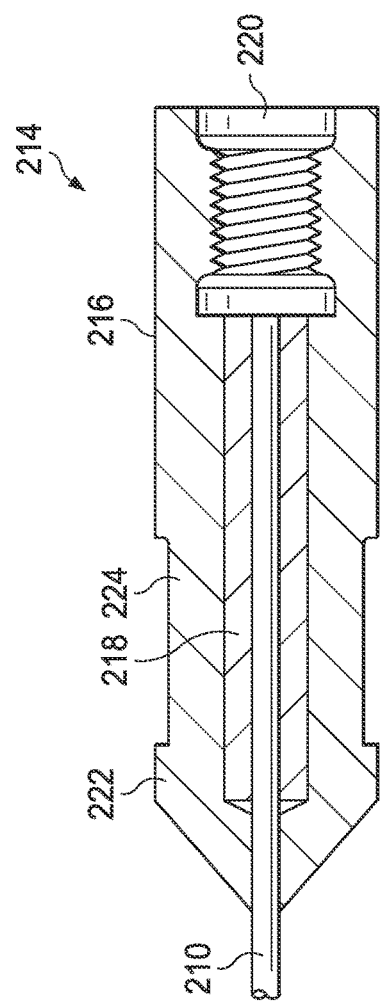
FIG. 2A
FIG. 2B

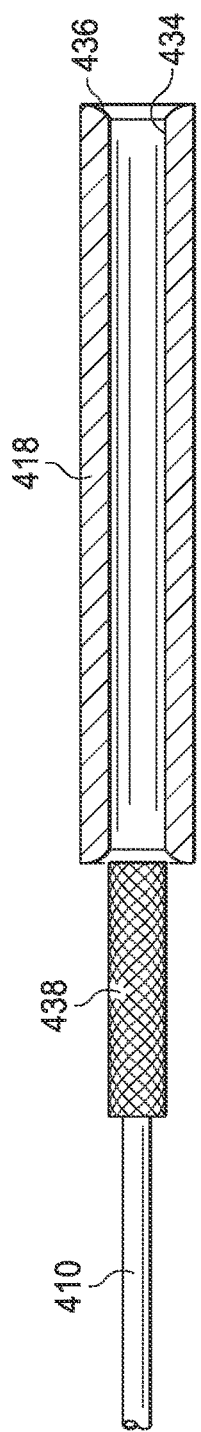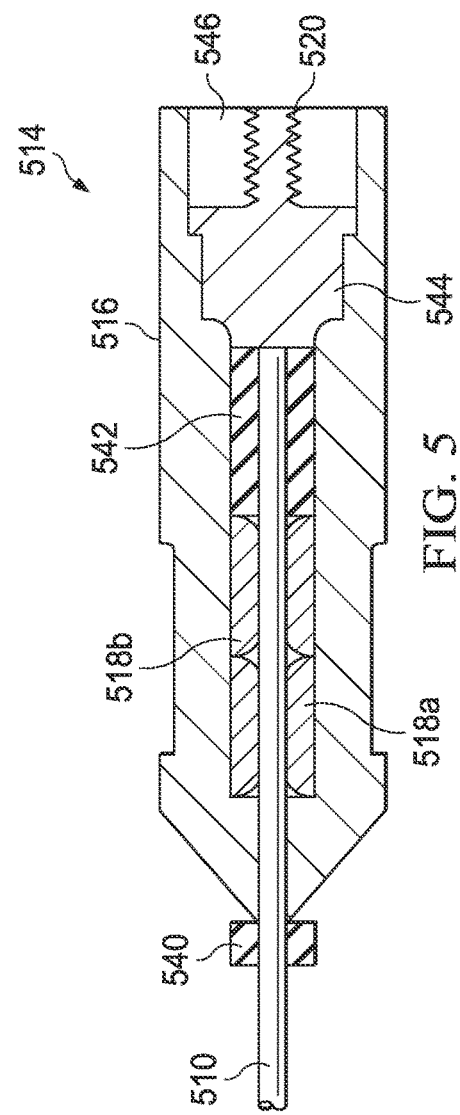

SHAPE MEMORY ALLOY ROPE SOCKET FOR A DOWNHOLE TOOL

RELATED APPLICATIONS

This application is a U.S. National Stage Application of International Application No. PCT/US2015/015838 filed Feb. 13, 2015, which designates the United States, and which is incorporated herein by reference in its entirety.

TECHNICAL FIELD

The present disclosure relates generally to hydrocarbon recovery operations and, more particularly, to a shape memory alloy rope socket for a downhole tool.

BACKGROUND

Hydrocarbons, such as oil and gas, are commonly obtained from subterranean formations that may be located onshore or offshore. The development of subterranean operations and the processes involved in removing hydrocarbons from a subterranean formation typically involve a number of different steps such as, for example, drilling a wellbore at a desired well site, treating the wellbore to optimize production of hydrocarbons, and performing the necessary steps to produce and process the hydrocarbons from the subterranean formation.

While performing subterranean operations, it is often desirable to suspend downhole tools in the wellbore from a rope, wire, line, or cable. Tools may be attached to the rope, wire, line, or cable via a clamp or other attachment mechanism. These attachment mechanisms often damage the rope, wire, line, or cable or provide a sub-optimal placement.

BRIEF DESCRIPTION OF THE DRAWINGS

For a more complete understanding of the present disclosure and its features and advantages, reference is now made to the following description, taken in conjunction with the accompanying drawings, in which:

FIG. 2A illustrates a cross sectional view of a rope socket that includes a shape memory alloy coupler in a disassembled configuration;

FIG. 2B illustrates a cross sectional view of a rope socket that includes a shape memory alloy coupler in an assembled configuration;

FIG. 4 illustrates a cross sectional view of a shape memory alloy coupler, a line, and a sleeve; and FIG. 5 illustrates a cross sectional view of a rope socket including sealing elements and a cavity for housing electronics equipment.

DETAILED DESCRIPTION

The present disclosure describes a shape memory alloy rope socket for use with a downhole tool. The rope socket may be used with any type of conveyance, such as a rope, cable, line, tube, or wire that may be used to suspend a downhole tool in a wellbore. The conveyance may be a single strand of line or may be made of multiple strands of line woven or braided together (e.g., compound or composite lines). Compound lines may be used when a stronger line is required to support a downhole tool or when multiple lines are required to carry different types of signals and/or data, for example the conveyance may include multiple fiber optic cables braided together and coated with a protective coating. In one embodiment, the rope socket may be used with a slickline that is used to suspend downhole tools in a wellbore and may come in varying lengths, according to the depth of the wellbore.

During a subterranean operation, the conveyance may be terminated with a rope socket and a downhole tool may be attached to the rope socket. The rope socket may include a shape memory alloy coupler surrounded by a housing. The housing may protect the coupler from the wellbore environment and include an attachment point to couple the rope socket with the downhole tool. When the downhole tool is suspended by the rope socket, the weight of the downhole tool may be transferred from the rope socket to the conveyance at the shape memory alloy coupler, where the conveyance and the rope socket are coupled. The shape memory alloy coupler may distribute the force caused by the weight of the downhole tool along the length of the coupler. The distribution of force may prevent a localized force on the conveyance and may avoid bends, kinks, stress, and/or other mechanical damage that may create a weak point in the conveyance. Accordingly, a system and method of use may be designed in accordance with the teachings of the present disclosure to reduce the occurrence of bends, kinks, stress, and/or mechanical damage to a conveyance and reduce the likelihood that the conveyance may become inoperable and/or break, thus improving the efficiency and reducing the cost of using downhole tools. Embodiments of the present disclosure and their advantages are best understood by referring to FIGS. 1 through 5, where like numbers are used to indicate like and corresponding parts.

Figure 1:
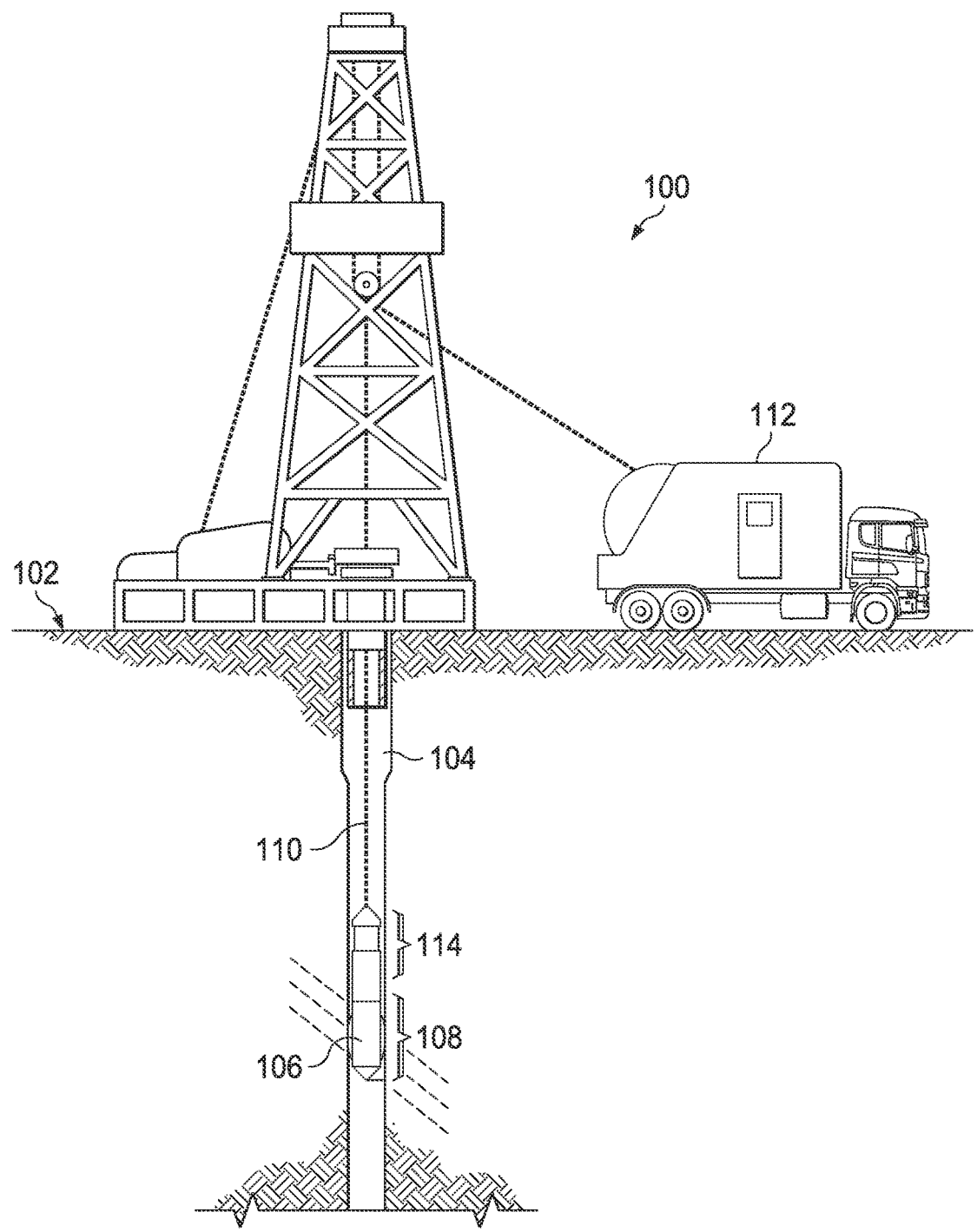
FIG. 1 illustrates an elevation view of an example embodiment of a subterranean operations system used in an illustrative wellbore environment.

FIG. 1 illustrates an elevation view of an example embodiment of a subterranean operations system used in an illustrative wellbore environment. Modern hydrocarbon drilling and production operations may use conveyances such as ropes, wires, lines, tubes, or cables (hereinafter "line") to suspend a downhole tool in a wellbore. Although FIG. 1 shows land-based equipment, downhole tools incorporating teachings of the present disclosure may be satisfactorily used with equipment located on offshore platforms, drill ships, semi-submersibles, and drilling barges (not expressly shown). Additionally, while wellbore 104 is shown as being a generally vertical wellbore, wellbore 104 may be any orientation including generally horizontal, multilateral, or directional.

Subterranean operations system 100 may include wellbore 104. "Uphole" may be used to refer to a portion of wellbore 104 that is closer to well surface 102 and "downhole" may be used to refer to a portion of wellbore 104 that is further from well surface 102. Subterranean operations may be conducted using wireline system 106 including one or more downhole tools 108 that may be suspended in wellbore 104 from line 110. Line 110 may be any type of conveyance, such as a rope, cable, line, tube, or wire which may be suspended in wellbore 104. In some embodiments, line 110 may be a single strand of conveyance. In other embodiments, line 110 may be a compound or composite line made of multiple strands of conveyance woven or braided together. Line 110 may be compound when a stronger line is required to support downhole tool 108 or when multiple strands are required to carry different types of power, signals, and/or data. As one example of a compound line, line 110 may include multiple fiber optic cables braided together and the cables may be coated with a protective coating. In another embodiment, line 110 may be a slickline. In a further embodiment, line 110 may be a hollow line or a line containing a sensitive core, such as a sensitive data transmission line.

The weight of downhole tool 108 may be transferred to line 110 at the points where the rope socket is in contact with line 110 and may exert a force on line 110. Localized forces and/or pressure exerted on line 110 may cause line 110 to be compressed or crushed at the contact point between rope socket 114 and line 110, which may cause damage to line 110. Slicklines, hollow lines, and lines containing a sensitive core may be likely to be crushed, weakened, or otherwise mechanically damaged by localized forces created when the slickline, hollow line, or line containing a sensitive core is coupled to downhole tool 108. When line 110 is damaged, the ability of line 110 to transmit signals (e.g., between logging facility 112 and downhole tool 108) may be reduced or eliminated. For example, when a fiber optic line 110 is crushed, the ability of line 110 to transmit light may be reduced and line 110 may be unable to transmit power, data, and/or signals. Additionally, damage to line 110 may cause a weak spot in line 110 that may increase the likelihood that line 110 may break during a subterranean operation.

Line 110 may include one or more conductors for transporting power, data, and/or signals to wireline system 106 and/or telemetry data from downhole tool 108 to logging facility 112. Alternatively, line 110 may lack a conductor, as is often the case using slickline or coiled tubing, and wireline system 106 may include a control unit that includes memory, one or more batteries, and/or one or more processors for performing operations to control downhole tool 108 and for storing measurements. Logging facility 112 (shown in FIG. 1 as a truck, although it may be any other structure) may collect measurements from downhole tool 108, and may include computing facilities for controlling downhole tool 108, processing the measurements gathered by downhole tool 108, or storing the measurements gathered by downhole tool 108. The computing facilities may be communicatively coupled to downhole tool 108 by way of line 110. While logging facility 112 is shown in FIG. 1 as being onsite, logging facility 112 may be located remote from well surface 102 and wellbore 104.

During a wireline operation, downhole tool 108 may be coupled to line 110 by rope socket 114, as shown in more detail in FIGS. 2A and 2B. Line 110 may terminate at rope socket 114 and downhole tool 108 may be coupled to rope socket 114 at a connector. For example, the downhole end of rope socket 114 may contain a connector, such as a threaded joint, a clamp, or a cotter pin, for attaching downhole tool 108. Additionally, line 110 may transmit control signals and/or power to downhole tool 108 and may transmit data from downhole tool 108 to logging facility 112. A kink, bend, stress, and/or mechanical damage in line 110 may decrease the ability of line 110 to transmit signals, power, and/or data and may increase the likelihood that line 110 may break during the subterranean operation. Therefore, it may be advantageous to attach downhole tool 108 to line 110 in a manner that enables downhole tool 108 to be suspended from line 110 and prevents any kinks, bends, mechanical damage, or stress on line 110, as discussed in further detail with respect to FIGS. 2-5. For example, rope socket 114 may include a coupler made out of a shape memory alloy that secures and terminates a downhole end of line 110. The coupler may be located in a housing of rope socket 114 and may provide an attachment point between line 110 and downhole tool 108. The coupler may provide even, distributed pressure across the length of the coupler to prevent mechanical damage on line 110, as further explained with respect to FIG. 2. As such, systems designed according to the present disclosure may enable more efficient and longer lasting lines for use in subterranean operations.

FIG. 2A illustrates a cross sectional view of a rope socket that includes a shape memory alloy coupler in a disassembled configuration. Rope socket 214 may include housing 216, coupler 218, and connector 220. Rope socket 214 may be similar to rope socket 114 show in FIG. 1 and may terminate line 210 and attach to a downhole tool (e.g., such as downhole tool 108 illustrated in FIG. 1).

Housing 216 may be made of any suitable material that may withstand the conditions in the wellbore, such as any material used to form drill bit components (e.g., steel, tungsten carbide, or polycrystalline diamond). Housing 216 may have any suitable shape that is compatible with the shape of the wellbore. For example, housing 216 may have a generally cylindrical shape where the wellbore cross section is generally circular. Housing 216 may be of any suitable size and the size of housing 216 may be defined by the requirements of the subterranean operation. For example, housing 216 may have any length from approximately six inches to approximately four feet and the length of housing 216 may be based on the weight of the downhole tool. As another example, the diameter of housing 216 may be constrained by the diameter of the wellbore into which housing 216 is inserted. Housing 216 may be hollow and may be designed such that coupler 218 may be inserted into internal space 225 of housing 216, as described in further detail with respect to FIG. 2B.

Coupler 218 may be made of a shape memory alloy that retains or remembers its original shape. A shape memory alloy may be deformed and may return to its original, pre-deformed shape when heated to a temperature above the transition temperature of the shape memory alloy. Example shape memory alloys include, but are not limited to, iron-manganese-silicon (Fe—Mn—Si), copper-aluminum-nickel (Cu—Al—Ni), or nickel-titanium (NiTi) alloys. The particular shape memory alloy used to form coupler 218 may be selected such that the transition temperature of the shape memory alloy is higher than the expected temperatures in the wellbore to prevent further changes in the shape of coupler 218 during the subterranean operation.

Coupler 218 may have any suitable shape such as a generally cylindrical shape with a hollow core. In a deformed, expanded condition, the inner diameter of coupler 218 may be larger than the diameter of line 210 such that line 210 may be easily inserted into coupler 218. Once line 210 is inserted, coupler 218 may be heated and may return to its original, reduced diameter state where the inner diameter of coupler 218 may be slightly smaller than the diameter of line 210. In the reduced diameter state, coupler 218 may grasp line 210 along the length of line 210 that is in contact with coupler 218 and may apply even pressure around the circumference of line 210, as described in more detail with respect to FIGS. 3A and 3B. Coupler 218 may be in contact with line 210 along the length of coupler 218 and may provide a large surface area of contact with line 210. Therefore, the stresses caused by the pressure of coupler 218 on line 210 due to the weight of the downhole tool may be distributed across a large surface area and reduce any localized stress that may cause damage to line 210. Localized stress and/or force may cause stress and/or mechanical damage to line 210 and may prevent line 210 from functioning properly, reduce the lifespan of line 210, and increase the likelihood that line 210 may break during a subterranean operation. Therefore, the use of rope socket 214 including coupler 218 may prevent concentrated or localized stress and/or force on line 210 when line 210 is terminated with rope socket 214.

The size of coupler 218 may be any suitable size such that the length of coupler 218 is long enough to provide enough friction such that rope socket 214 securely holds line 210. Additionally, the length of coupler 218 may be based on the surface area used to distribute the weight of the downhole tool. For example, a heavier downhole tool may require coupler 218 to be longer than the length required if the downhole tool is lighter.

FIG. 2B illustrates a cross sectional view of a rope socket that includes a shape memory alloy coupler in an assembled configuration. In the assembled configuration, housing 216 may surround coupler 218 to protect coupler 218 from, for example, fluids and/or gases that may be present in a wellbore, such as wellbore 104 shown in FIG. 1. Due to the protection of housing 216, coupler 218 may be formed of a material that may not normally be suitable for withstanding the conditions in the wellbore.

The shape of housing 216 may include end 222 and neck 224. The profile of end 222 and neck 224 may enable an operator of a subterranean operation to grasp, with a tool designed to retrieve downhole tools from a wellbore, rope socket 214 and remove rope socket 214 and an attached downhole tool from the wellbore in the event that line 210 breaks during the subterranean operation. For example, during a recovery operation after a line break, the operator may be able to hook a recovery tool onto end 222 and retrieve rope socket 214 and the attached downhole tool from the wellbore.

During a subterranean operation, prior to deploying rope socket 214 into the wellbore, an operator may assemble rope socket 214 by passing line 210 through pathway 226 in end 222 of housing 216. Line 210 may be pulled through the length of housing 216 and through connector 220. The operator may then insert line 210 into coupler 218 while coupler 218 is in a deformed state. Once line 210 passes through the length of coupler 218, the operator may heat coupler 218 to transition coupler 218 from the deformed state to a reduced diameter state such that line 210 is securely held by coupler 218. Coupler 218 may be heated with any suitable heating mechanism, such as a heat gun, an oven, or an induction heater. Coupler 218 may then be inserted into housing 216 from the downhole end of housing 216 through connector 220. A downhole tool may be attached to rope socket 214 at connector 220. Once assembled, rope socket 214 and the downhole tool may be deployed into the wellbore, e.g., wellbore 104 shown in FIG. 1. In embodiments where line 210 transmits power, signals, and/or data to and from the downhole tool to a logging facility, line 210 may then be connected to one or more electronic components of the downhole tool. The downhole tool may be connected to rope socket 214 at connector 220. Connector 220 may be located at a downhole end of rope socket 214. Connector 220 may be a junction between rope socket 214 and a downhole tool and may include any suitable joining mechanism where the downhole tool may be connected to rope socket 214, such as a threaded joint, a clamp, or a cotter pin. In some embodiments, connector 220 may additionally include an electrical joint (not expressly shown). The electrical joint may allow internal wires of line 210 to be connected to the downhole tool without exerting any mechanical stress on the internal wires. In another embodiment, such as a slickline embodiment, line 210 may be terminated at the end of coupler 218 and may not be attached to the downhole tool.

When rope socket 214 is suspended in the wellbore, the tension in line 210 may hold coupler 218 in place against the surface of end 222 while gravity may pull housing 216 downhole. The tension effects and gravity effects may act to secure coupler 218 in housing 216 without the use of a separate fastener.

Coupler 218 may be treated as a consumable resource during the subterranean operation. For example, if the length of line 210 required for the subterranean operation changes, coupler 218 may be removed from housing 216 and line 210 may be cut to remove from coupler 218. Coupler 218 may then be discarded and a new coupler 218 may be used to change the length of line 210 and terminate the remaining length of line 210. The use of coupler 218 may reduce the labor required when terminating line 210 due to the simplicity of inserting line 210 into coupler 218 during a subterranean operation. Additionally, the use of coupler 218 may reduce the likelihood of operator error when terminating line 210 due to coupler 218 distributing the force of the weight of the logging tool along the length of coupler 218 which eliminates the need for the operator to carefully place a clamp or other line terminating device on line 210.

Figure 3B:
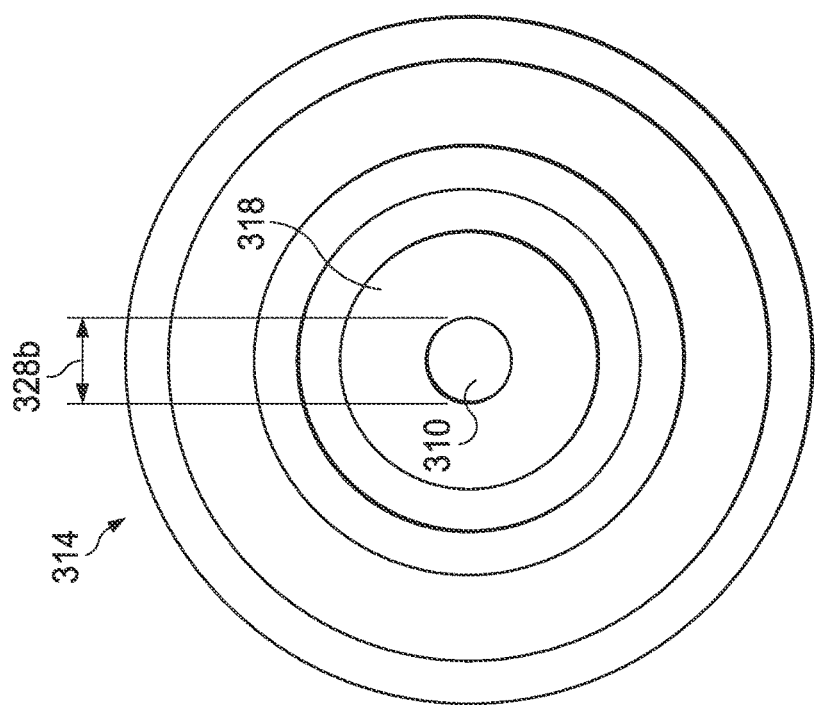
FIG. 3B illustrates a side view of the downhole end of a rope socket including a shape memory alloy coupler in a reduced diameter state.
Figure 3A:
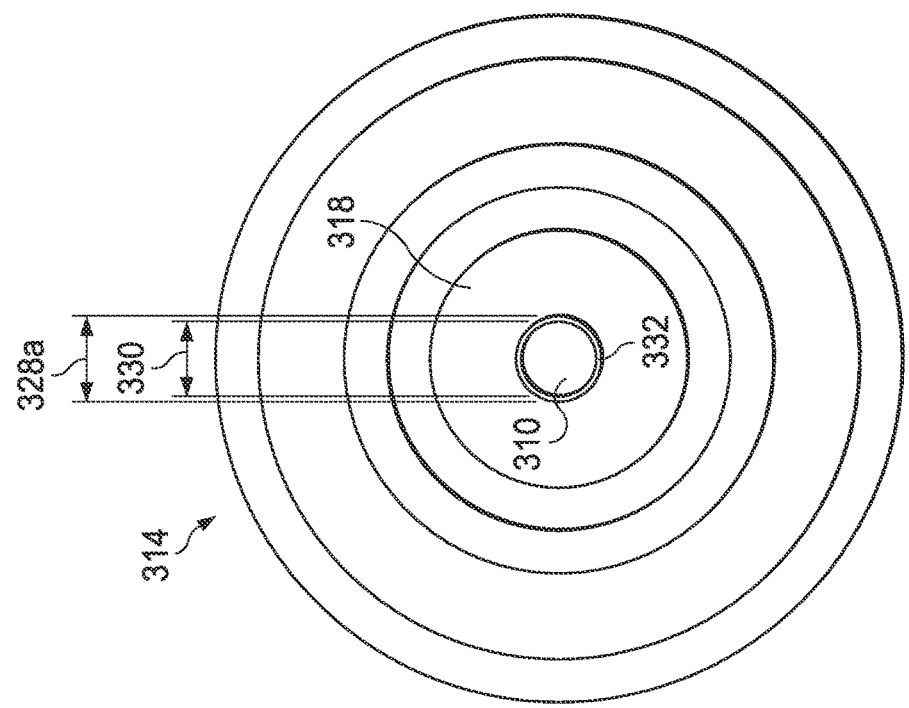
FIG. 3A illustrates a side view of the downhole end of a rope socket including a shape memory alloy coupler in a deformed state.

FIG. 3A illustrates a side view of the downhole end of a rope socket including a shape memory alloy coupler in a deformed state. In the deformed state, inner diameter 328a of coupler 318 may be larger than diameter 330 of line 310. When coupler 318 is in the deformed state, line 310 may easily pass through coupler 318. After line 310 passes through inner diameter 328a of coupler 318, space 332 may remain between inner diameter 328a of coupler 318 and diameter 330 of line 310.

Coupler 318 may then be heated to cause coupler 318 to contract to a reduced diameter state. FIG. 3B illustrates a side view of the downhole end of a rope socket including a shape memory alloy coupler in a reduced diameter state. In the reduced diameter state, coupler 318 may be in contact with and securely grasp line 310 and space 332, shown in FIG. 3A, may be eliminated.

Coupler 318 may transform from the deformed state to the reduced diameter state when coupler 318 is heated above the transition temperature of the shape memory alloy from which coupler 318 is made. The transition temperature of the shape memory alloy may be higher than the expected temperature in the wellbore such that while in use, coupler 318 may not transform from one state to another state. For example, the transition temperature of the shape memory alloy may be any temperature from approximately one hundred degrees Fahrenheit to approximately four hundred degrees Fahrenheit. Coupler 318 may be heated with any suitable heating mechanism, such as a heat gun, an oven, or an induction heater. The use of a portable heating mechanism, such as a heat gun, may allow coupler 318 to be heated and transformed from the deformed state to the reduced diameter state at the well site by an operator, rather than offsite, which may increase the efficiency of the subterranean operation.

In the reduced diameter state, coupler 318 may grasp line 310 through an interference or press fit, where the friction between coupler 318 and line 310 may keep coupler 318 and line 310 from sliding relative to each other without requiring a separate fastener. The interference fit between coupler 318 and line 310 may provide relatively constant pressure around the circumference of line 310 and distribute the pressure along the length of coupler 318. The relatively constant and distributed pressure may prevent damage to line 310 caused by localized pressure, such as compression or crushing of line 310.

FIG. 4 illustrates a cross sectional view of a shape memory alloy coupler, a line, and a sleeve. In some embodiments, inner surface 434 of coupler 418 may be textured to provide a higher coefficient of friction when coupler 418 is in contact with line 410 in a reduced diameter state. For example, inner surface 434 may be threaded, knurled, sandblasted, serrated, or otherwise textured to eliminate the smoothness of inner surface 434. The texturing of inner surface 434 may be such that as coupler 418 is deformed into a deformed state and then transformed back to a reduced diameter state, the texturing of inner surface 434 remains intact. Texturing inner surface 434 may increase the surface area of coupler 418 that is in contact with line 410. The textured surface area may increase the coefficient of friction between line 410 and coupler 418. In some embodiments, texturing inner surface 434 may allow the length of coupler 418 to be reduced because the length of coupler 418 used to achieve an amount of friction between coupler 418 and line 410 (e.g., via the interference fit) when inner surface 434 is textured may be less than the length of coupler 418 used to achieve the same amount of friction between coupler 418 and line 410 when inner surface 434 is not textured.

In some embodiments, coupler 418 may include rounded edges 436 at one or both ends of coupler 418. Rounded edges 436 may provide lead-in angles at the ends of coupler 418 to reduce the stress on line 410 at the ends of coupler 418. Rounded edges 436 may prevent a sharp increase in the force exerted on line 410 caused by coupler 418 which may cause stress, bending, and/or other mechanical damage to line 410. For example, in embodiments where coupler 418 includes rounded edges 436, the force exerted on line 410 by the pressure of the interference fit between coupler 418 and line 410 may be gradually increased from the ends of coupler 418 throughout the span of rounded edges 436. In embodiments using composite or compound lines, rounded edges 436 may preserve the composite structure and prevent crushing or other damage to the composite line that may occur if the edges of coupler 418 are not rounded and the pressure caused by coupler 418 sharply increases. The radius of rounded edges 436 may be any suitable radius that provides a smooth transition of forces applied to line 410. For example, the radius of rounded edges 436 may be greater than approximately 0.050-inch.

In some embodiments, a rope socket may additionally include sleeve 438 into which line 410 may be inserted prior to inserting line 410 into coupler 418. Sleeve 438 may provide increased friction between line 410 and coupler 418. The use of sleeve 438 may allow the length of coupler 418 to be reduced because the length of coupler 418 used to achieve an amount of friction between coupler 418 and line 410 (e.g., via the interference fit) when sleeve 438 is used may be less than the length of coupler 418 used to achieve the same amount of friction between coupler 418 and line 410 when sleeve 438 is not incorporated in the rope socket assembly.

In embodiments where line 410 includes multiple cables braided together and surrounded by a protective coating, sleeve 438 may penetrate the protective coating to enable coupler 418 to grasp the braided cables of line 410 instead of grasping only the protective coating. Grasping the braided cables may provide an increased hold on line 410. The increased hold may prevent the occurrence of an event where the protective coating detaches from the braided cables during use and allows the rope socket, which may be grasping only the protective coating, to fall into the wellbore. Sleeve 438 may be made of any suitable materials, such as mesh, a metallic compound, sand paper, steel wool, or any other material suitable to penetrate any coating on line 410 and increase the coefficient of friction between coupler 418 and line 410. The size of sleeve 438 may be any suitable size. For example, the length of sleeve 438 may be approximately equal to the length of coupler 418. The thickness of sleeve 438 may be any sufficient thickness such that sleeve 438 may penetrate the protective coating and grasp the internal wires of line 410. For example, the thickness of sleeve 438 may be greater than the thickness of the protective coating on line 410.

FIG. 5 illustrates a cross sectional view of a rope socket including sealing elements and a cavity for housing electronics equipment. In some embodiments, coupler 518a and 518b ("couplers 518") may not be compatible with the wellbore environment and may not be made of materials that can withstand the fluids and/or gases present in the wellbore. Therefore, rope socket 114 may include uphole sealing element 540 and downhole sealing element 542. Uphole sealing element 540 may provide a seal around line 510 at the uphole end of housing 516 such that fluids and/or gases present in the wellbore environment may not enter housing 516 and contact couplers 518. Likewise, downhole sealing element 542 may be located downhole from couplers 518 and may provide a seal around line 510 at the downhole end of housing 516 such that fluids and/or gases present in the wellbore environment may not contact couplers 518. Uphole sealing element 540 and downhole sealing element 542 may be made of any type of suitable sealing material, such as an elastomer or a graphite flex seal. Uphole sealing element 540 and downhole sealing element 542 may be any suitable shape and size such that uphole sealing element 540 and downhole sealing element 542 prevent wellbore fluids and/or gases from entering housing 516 and contacting couplers 518.

Seal base 544 may provide a base for downhole sealing element 542 such that downhole sealing element 542 remains in position between seal base 544 and couplers 518. Seal base 544 may be held in place by the end of a downhole tool (not expressly shown) that may be connected to rope socket 514 at connector 520. Connector 520 may include any suitable joining mechanism where line 510 may be terminated and the downhole tool may be connected to rope socket 514. For example, connector 520 is shown as include threads, although connector 520 may include any suitable fastening mechanism such as a clamp or a cotter pin.

In some embodiments, housing 516 may include cavity 546 for housing one or more electronic devices. The size of housing 516 may be determined based on the size of the electronic devices (not expressly shown) that may be located in cavity 546. For example, the size of housing 516 may be increased to accommodate the electronic devices. The electronic devices may include a control unit that contains memory, one or more batteries, and/or one or more processors for performing operations to control the downhole tool and for storing measurements associated with the downhole tool. In embodiments where line 510 is a fiber optic cable, the electronic devices may include optical devices that provide a mechanism for sending power and/or communication through line 510 to a logging facility, such as logging facility 112 shown in FIG. 1, or sensing light signals that may be transmitted via line 510. In some embodiments, connector 520 may additionally include an electrical joint (not expressly shown). The electrical joint may allow internal wires of line 510 to be connected to the downhole tool or to the electronic devices included in cavity 546 of housing 516 without exerting any mechanical stress on the internal wires. In another embodiment, such as a slickline embodiment, line 510 may be terminated at the end of rope socket 514 and may not be attached to the downhole tool. In some embodiments, the electronic devices may be located uphole from downhole sealing element 542 such that downhole sealing element 542 prevents wellbore elements (e.g., fluids and/or gases) from penetrating the electronic devices.

In some embodiments, more than one rope sockets 514 may be used to terminate line 510. In other embodiments, multiple rope sockets 514 may be connected in series to connect multiple pieces of line 510. In a further embodiment, housing 516 may be of a sufficient length that more than one coupler 518 may be inserted in housing 516 as shown in FIG. 5. Multiple couplers 518 may be used when additional friction may be required to terminate line 510 and further distribute the pressure of couplers 518 across a larger surface area of line 510. The multiple couplers 518 may be inserted in housing 516 in series and may be located between one or more sealing elements 540 and 542.

Embodiments disclosed herein include:

A. A line termination device including a coupler formed of a shape memory alloy, a housing surrounding the coupler, the housing including a pathway and a connector for attaching a downhole tool, and a line passing through the pathway and the coupler such that the coupler is in contact with the line along a length of the coupler when the coupler is in a reduced diameter state, the coupler configured to prevent movement of the line relative to the coupler.

B. A method of using a line termination device including passing a line through a pathway in a housing, inserting the line through an inner surface of a first coupler while the first coupler is in a deformed state, the first coupler formed of a shape memory alloy, heating the first coupler to a temperature above a transition temperature of the first coupler such that the first coupler transitions from the deformed state to a reduced diameter state where the first coupler is configured to prevent movement of the line relative to the coupler when in the reduced diameter state, and placing the coupler into an internal space of the housing.

C. A wireline system including a downhole tool, a line termination device connected to the downhole tool, the line termination device including a coupler formed of a shape memory alloy, a housing surrounding the coupler, the housing including a pathway and a connector for attaching a downhole tool, and a line passing through the pathway and the coupler such that the coupler is in contact with the line along a length of the coupler when the coupler is in a reduced diameter state, the coupler configured to prevent movement of the line relative to the coupler.

Each of embodiments A, B, and C may have one or more of the following additional elements in any combination: Element 1: further comprising a sealing element located at an end of the coupler. Element 2: wherein an inner surface of the coupler is textured. Element 3: further comprising a sleeve located between the line and an inner surface of the coupler. Element 4: wherein an end of the coupler is rounded. Element 5: further comprising a cavity for receiving an electronic device. Element 6: where in the coupler is a plurality of couplers placed in series along the line. Element 7: further comprising attaching a downhole tool to a connector on the housing. Element 8: further comprising sealing an end of the first coupler with a sealing element to prevent a wellbore fluid or gas from contacting the first coupler. Element 9: further comprising wrapping a sleeve around the line before the line is inserted through the inner surface of the first coupler. Element 10: further including inserting the line through an inner surface of a second coupler and placing the second coupler in the internal space of the housing downhole from the first coupler.

Although the present disclosure and its advantages have been described in detail, it should be understood that various changes, substitutions and alterations can be made herein without departing from the spirit and scope of the disclosure as defined by the following claims. For example, while the embodiment discussed describes a cylindrically shaped coupler, the coupler may be any suitable shape according to the shape of the housing and according to the specific use and/or wellbore conditions. It is intended that the present disclosure encompasses such changes and modifications as fall within the scope of the appended claims.

What is claimed is:

1. A line termination device comprising:
   a coupler formed of a shape memory alloy; a housing surrounding the coupler, the housing including: an uphole end;
   a pathway into which the coupler is inserted, the coupler secured against a surface of the uphole end; and
   a connector for attaching a downhole tool; a line passing through the pathway and the coupler
   a protective coating surrounding the line; and
   a sleeve between the coupler and the protective coating, the sleeve penetrating the protective coating to contact the line, such that the coupler is in contact with the line via the sleeve along a length of the coupler when the coupler is in a reduced diameter state, the coupler configured to prevent movement of the line relative to the coupler.

2. The line termination device of claim 1, further comprising a sealing element located at an end of the coupler.

3. The line termination device of claim 1, wherein an inner surface of the coupler is textured.

4. The line termination device of claim 1, wherein an end of the coupler is rounded.

5. The line termination device of claim 1, further comprising a cavity for receiving an electronic device.

6. The line termination device of claim 1, wherein the coupler is a plurality of couplers placed in series along the line.

7. A method of using a line termination device comprising:
   placing a protective coating surrounding a line;
   wrapping a sleeve around the protective coating;
   passing the line through a pathway in a housing;
   inserting the line through an inner surface of a first coupler while the first coupler is in a deformed state, the first coupler formed of a shape memory alloy, wherein the sleeve is positioned between the line and the coupler;
   heating the first coupler to a temperature above a transition temperature of the first coupler such that the first coupler transitions from the deformed state to a reduced diameter state, wherein the sleeve penetrates the coating to contact the line when the coupler is in the reduced diameter state, the first coupler configured to prevent movement of the line relative to the coupler when in the reduced diameter state; and
   placing the coupler into an internal space of the housing against a surface of an uphole end of the housing.

8. The method of claim 7, further comprising attaching a downhole tool to a connector on the housing.

9. The method of claim 7, further comprising sealing an end of the first coupler with a sealing element to prevent a wellbore fluid or gas from contacting the first coupler.

10. The method of claim 7, wherein the inner surface of the first coupler is textured.

11. The method of claim 7, wherein an end of the first coupler is rounded.

12. The method of claim 7, wherein the housing includes a cavity for receiving an electronic device.

13. The method of claim 7, further comprising:
inserting the line through an inner surface of a second coupler; and
placing the second coupler in the internal space of the housing downhole from the first coupler.

14. A wireline system comprising:
a downhole tool;
a line termination device connected to the downhole tool, the line termination device including:
a coupler formed of a shape memory alloy; a housing surrounding the coupler, the housing including: an uphole end;
a pathway into which the coupler is inserted, the coupler secured against a surface of the uphole end; and
a connector for attaching a downhole tool;
a line passing through the pathway and the coupler
a protective coating surrounding the line; and
a sleeve between the coupler and the protective coating, the sleeve penetrating the protective coating to contact the line, such that the coupler is in contact with the line via the sleeve along a length of the coupler when the coupler is in a reduced diameter state, the coupler configured to prevent movement of the line relative to the coupler.

15. The wireline system of claim 14, further comprising a sealing element located at an end of the coupler.

16. The wireline system of claim 14, wherein an inner surface of the coupler is textured.

17. The wireline system of claim 14, wherein an end of the coupler is rounded.

* * * * *